May 6, 1969 J. ANTELL 3,442,031
SHOE AND METHOD AND LAST FOR MAKING SAME
Filed Feb. 4, 1965 Sheet 1 of 6

Inventor:
Joseph Antell,
by Arthur D. Thomson
Attorney

United States Patent Office 3,442,031
Patented May 6, 1969

3,442,031
SHOE AND METHOD AND LAST FOR
MAKING SAME
Joseph Antell, 425 Glen Road, Weston, Mass. 02193
Continuation-in-part of application Ser. No. 396,960,
Sept. 16, 1964. This application Feb. 4, 1965, Ser.
No. 432,444
Int. Cl. A43b *3/26, 13/38;* D05b *35/02*
U.S. Cl. 36—2.5                                    11 Claims This invention relates to the manufacture of shoes and pertains more particularly to shoes which are adjustable to fit various foot sizes. This application is a continuation-in-part of my preveious application Ser. No. 396,960, filed Sept. 16, 1964, now abandoned.

Shoes are presently manufactured in a range of standard lengths or sizes, designated by numbers, and in a range of standard widths designated by letters. A separate last is required for each size and each width in that size. It is possible to use the same dies and patterns to make shoes in several widths in a particular size, but separate lasts are required for each width. In the manufacture of high grade shoes it is customary to employ a different set of patterns and dies for each size and width. To manufacture the average range of widths in women's shoes from AAA to B, for example, four sets of lasts, patterns and dies are required for each size. As there are thirteen sizes (including half sizes) in the average range from 4 to 10, fifty-two different sets of lasts, patterns and dies are required to make a full line of one style of shoe. In some cases, shoes are made in an even larger range of widths, for example, from AAAA to EE. The cost of the lasts, patterns and dies is a substantial factor in the cost of production of the shoes, especially in the case of women's shoes which are subject to frequent style changes. Furthermore, the demand for each size cannot be accurately predicted so that the manufacturer is frequently left with surpluses and broken lots which he has to sell at a loss.

On the retail level, a considerable investment is required to stock a full line of sizes, and the store is almost certain to be left with some broken lots which have to be sold at reduced prices. Sales are often lost because the store does not have the particular style and color of shoe which the customer wants in the customer's size.

The principal object of this invention is to provide a shoe which can be readily adjusted as to width, and to some extent as to length, at the point of sale to the wearer, and is nevertheless indistinguishable in appearance and quality from a shoe manufactured to one particular width. Another object is to provide a shoe construction and method of manufacture which permits one set of lasts, patterns, and dies to be used to make shoes in several widths, without impairing the quality of the shoes. Other objects, advantages, and novel features will be apparent from the following description.

The shoe here disclosed has an auxiliary sole, which may cover the forepart or the full length of the sole, installed between the insole and sock lining, or in some cases on top of the sock lining. The auxiliary sole is installed during manufacture and may be anchored in the shoe at one point, by cement, staples, or other type of attachment, but is left unattached in the forepart. The sock lining is also left unattached in the forepart. The auxiliary sole may be made in one or more layers and its surface is covered with an inactivated adhesive, for example, a pressure sensitive adhesive covered with a peelable backer of non-sticking material. At the point of sale, if the shoe fits the customer, the salesman lifts up the forepart of the sock lining and the auxiliary sole, removes the backer and permanently secures the auxiliary sole and sock lining in place, so that the auxiliary sole becomes a permanent part of the sole assembly. If the shoe is too narrow, the salesman may remove one or more layers of the auxiliary sole, or take it out entirely, depending on the degree of adjustment required.

According to one method of manufacture here disclosed, the auxiliary sole is died out to the exact size and shape required and attached to the insole before the latter is placed on the last. An alternative method is to attach the auxiliary sole to the sock lining before the latter is assembled into the shoe. In this case the shoe is lasted on a special last having a filler block shaped to occupy the space which is to be occupied by the auxiliary sole in the finished shoe. The insert may also be molded to conform to the shape of the last on which the shoe is made, and placed in the shoe loose, after the shoe is completed.

In the following drawings illustrating the invention, the thickness of the various layers making up the sole assembly is exaggerated for clarity.

Figure 1:
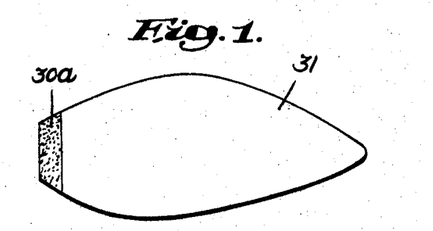
FIG. 1 is a plan view of a forepart auxiliary sole used in the construction of a shoe according to the invention.
Figure 2:
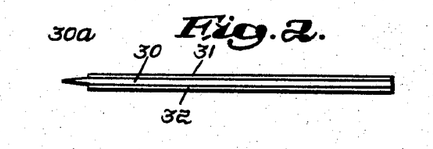
FIG. 2 is a side elevation of the auxiliary sole of FIG. 1.

FIGS. 1 and 2 illustrate a sole 20, made of flexible material such as leather or one of the synthetic materials commonly used for other parts of a shoe sole assembly such as insole foreparts. The auxiliary sole is died out to the same shape as the forepart of the insole of the shoe for which it is intended and is coated with pressure sensitive or contact adhesive on its upper and lower faces. Backers 31 and 32 are disposed on the faces of the auxiliary sole and cover all except an exposed rear margin 30a, which is preferably skived to a taper. The backers are made of a thin material such as Holland Cloth, or smooth plastic film, which will stick temporarily to the adhesive but can be readily peeled off.

Figure 3:
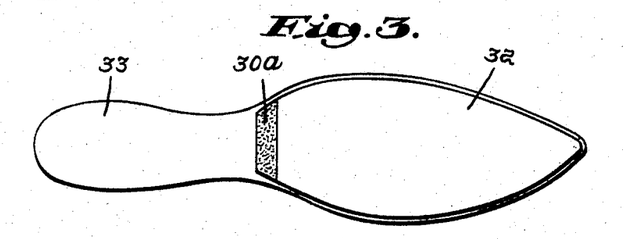
FIG. 3 is a top plan view of an insole with the auxiliary sole of FIG. 1 applied.

According to one method of manufacture, the auxiliary sole is laid on the upper surface of an insole 33 in the correct position to cover the forepart, and one face of the exposed margin 30a is attached by adhesive to the insole. Preferably the auxiliary sole is cut slightly smaller than the insole forepart all around. Another method of assembly is to lay the auxiliary sole on the last and place the insole over it and bond the insole to margin 30a. It is understood that both parts may be temporarily tacked or stapled to the last in the customary manner to hold them in place during the lasting operations.

Figure 4:
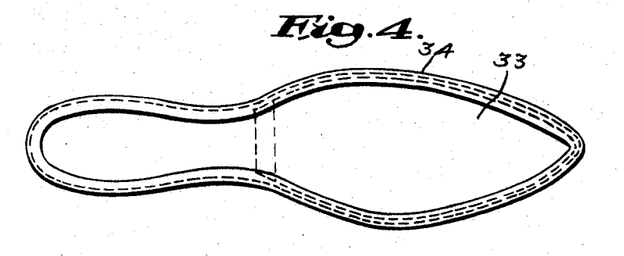
FIG. 4 is a bottom view of a lasted shoe incorporating the auxiliary sole of FIG. 1.
Figures 5, 6:
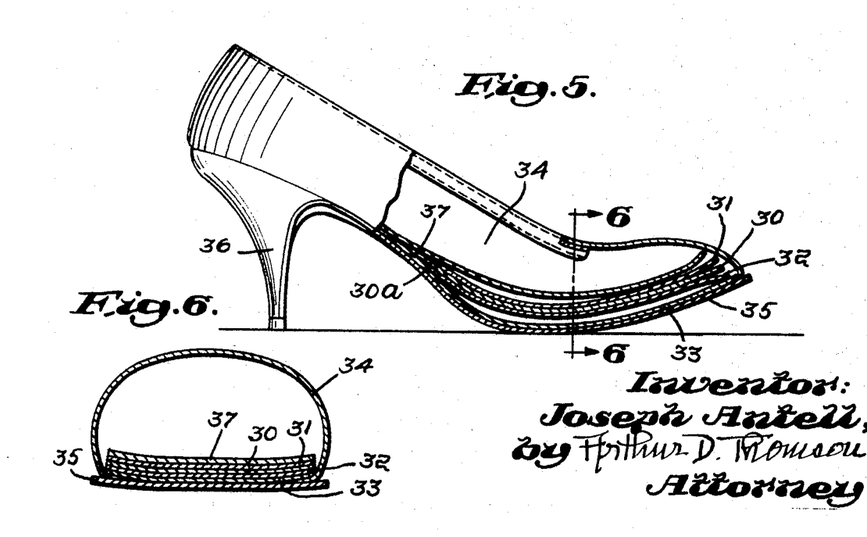
FIG. 5 is a side elevation, partly in cross-section of a shoe constructed according to the invention, incorporating the auxiliary sole of FIG. 1.
FIG. 6 is an enlarged cross-section taken along line 6—6 of FIG. 5.

The auxiliary sole and insole assembly is laid on a last, with the auxiliary sole facing the last, and the upper 34 lasted to the margin of the insole in the usual manner, for example, by cementing the upper or by securing to a welt on the under side of the insole. The shoe here shown is of the cemented sole type. The shoe is finished by applying an outsole 35 and heel 36, removing the last and adding a sock lining 37, and performing the other customary finishing operations in the usual manner. The sock lining 37, when installed, adheres to margin 30a of the auxiliary sole.

In the finished shoe, as it is furnished to the store, the sock lining is cemented to the insole 33 to the rear of the auxiliary sole assembly but is free in the forepart. The auxiliary sole is secured to the insole at margin 30a, but is prevented by backers 31 and 32 from sticking to the insole or the sock lining in the forepart. In FIG. 5 the various layers are shown separated for clarity but they normally lie over one another as shown in FIG. 6.

The auxiliary sole is preferably of such a thickness that it reduces the girth of the shoe in the ball by an amount equivalent to one width, the ball being the region where the major variations in foot width occur. According to present standards the difference in girth at the ball of shoes of the same length is ¼ inch per width in most cases. An auxiliary sole 30 which is ⅛ inch thick, or one half the increased width will therefore reduce the girth by one width. The backers 31 are preferably of negligible thickness as compared to the auxiliary sole. It is understood that for shoes made to other width scales, for example, in the infant size range, the auxiliary sole may be made of appropriate thickness. If the shoe of FIG. 5 is manufactured on a standard 6AA last with the auxiliary sole in place, for example, the shoe will become a 6A when the auxiliary sole is removed.

Figure 7:
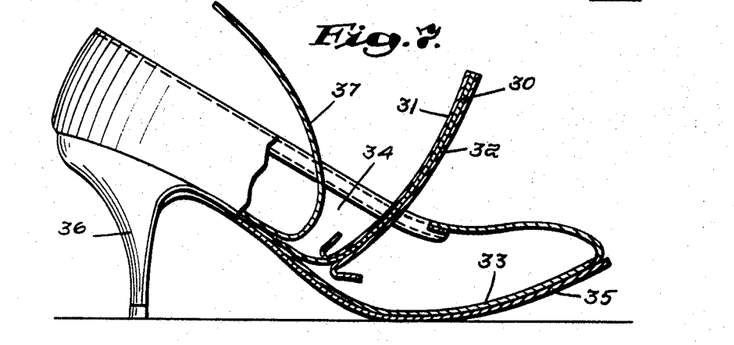
FIG. 7 is a side elevation, partly in cross-section of the shoe of FIG. 5 in the process of adjustment to fit the customer.
Figure 8:
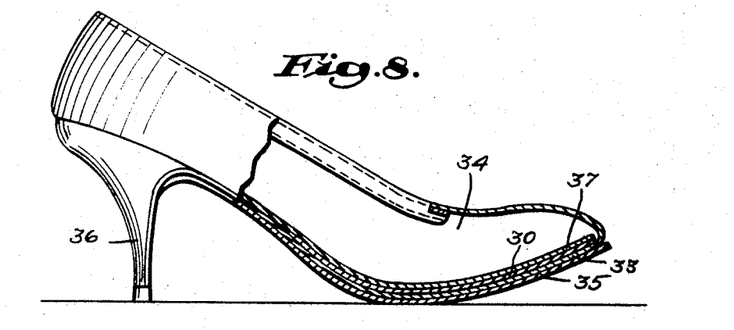
FIG. 8 is a side elevation partly in cross-section of the shoe of FIG. 5 as ready to wear.

At the point of sale the customer can try the shoe on in the condition shown in FIG. 5. If the shoe fits properly, the salesman pulls back the sock lining and auxiliary sole, as illustrated in FIG. 7, peels off backers 31 and 32, and replaces the auxiliary sole and sock lining in the forepart.

The adhesive used on the auxiliary sole may be a pressure sensitive type which allows the smooth backers to be peeled off readily, but will adhere firmly to the more porous surfaces of the insole and sock lining so that the auxiliary sole, insole and sock lining become permanently bonded together under pressure. A "contact" type of cement, which will stick only to a surface coated with the same or a compatible material may also be used. In that case, the upper surface of insole 33 and under surface of sock lining 37 are also coated with the cement or compatible material in the forepart so that the auxiliary sole can be bonded to them when the backers are removed.

If the customer requires a wider shoe, the salesman can remove the auxiliary sole assembly and replace the sock lining. If the sock lining and insole are coated with contact type cement, they will adhere together. Alternatively one or the other may be coated with a cement which will not adhere to the backers, or the forepart of the sock lining and insole may be left uncoated. In the latter case the salesman applies an adhesive, such as rubber cement, to the bottom of the sock lining forepart.

Figure 9:
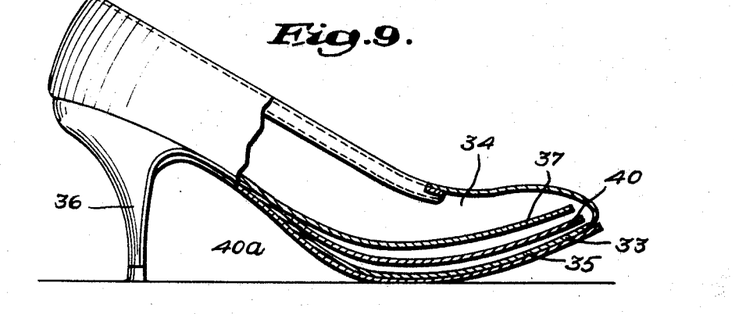
FIG. 9 is a side elevation, partly in cross-section of a shoe with a modified form of auxiliary sole.

The shoe of FIG. 9 shows a construction incorporating an auxiliary sole 40 which is essentially the same as auxiliary sole 30, but is coated with an adhesive which will not stick to the adjacent surface until it is activated, for example, by heat or by application of a suitable solvent. The auxiliary sole has a rear margin 40a which is attached to the insole by suitably activating the adhesive at that point. The shoe is manufactured as previously described. This shoe can be prepared for wear by heating or otherwise activating the adhesive on the auxiliary sole so that it bonds to the sock lining 37 and insole 33. If the shoe is too narrow the auxiliary is removed, and the sock lining bonded or cemented to the insole as previously described.

Figure 10:
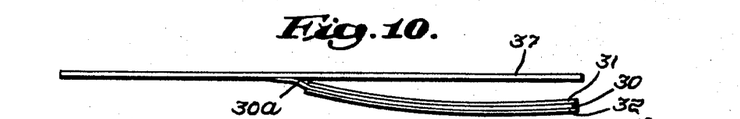
FIG. 10 is a side elevation of the auxiliary sole of FIG. 1 assembled onto a sock lining according to an alternative method of construction.

FIG. 10 illustrates an alternative method of manufacture. The auxiliary sole assembly of FIG. 1 is initially attached at margin 30a to the sock lining 37. The shoe is lasted on the last 41 shown in FIG. 11. This last is of a conventional size and shape, but is equipped with a plate 42 applied to the bottom of the forepart. This plate is preferably made of metal and carries prongs 43 which are driven into the last. The plate is of the same size, shape, and thickness, as the auxiliary sole, so that the shoe, after lasting, is of the proper proportions in the forepart to receive the auxiliary sole when the sock lining is installed. When the sock lining and auxiliary sole assembly is inserted the finished shoe is substantially the same as that of FIG. 5 and prepared for wear in the same manner when sold. The shoe may also be completed by inserting the auxiliary sole and sock lining separately.

The major variations in foot width occur across the ball of the foot. The variation in heel width for a given length is much less. For that reason, an auxiliary sole which covers only the forepart provides adequate adjustment and the heel portion of the shoe which corresponds to the narrower width, will fit a foot of the width which the forepart becomes when the auxiliary sole is removed. In fact, shoes are often made on "combination lasts" in which the heel is purposely made one or two sizes narrower than the forepart to provide a snug fit in the heel. Removal of an auxiliary sole in the forepart, makes the shoe essentially a "combination last" shoe.

Figures 12, 13:
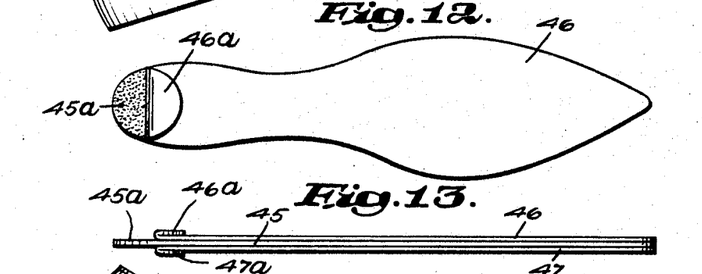
FIG. 12 is a plan view of full length form of auxiliary sole.
FIG. 13 is a side elevation of the auxiliary sole of FIG. 12.

If it is desirable to provide some adjustment in the heel area, a full length auxiliary sole assembly such as that shown in FIG. 12 and FIG. 13 may be used. The auxiliary sole 45 is made of flexible sheet material, cut to the shape of the insole of the shoe for which it is intended, or slightly smaller, for example ⅟₁₆ inch all around. The auxiliary sole is coated with adhesive and covered with peelable backers 46 and 47 cut to the same shape as the filler sole. The backers are folded forward at the heel to form tabs 46a, 47a, and leave an exposed rear margin 45a.

Figures 14, 15:
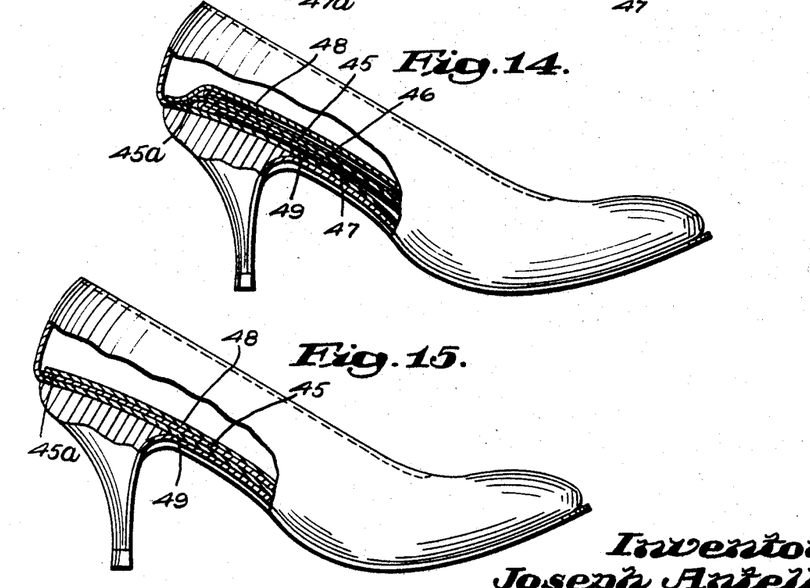
FIG. 14 is a side elevation, partly in cross-section, of a shoe incorporating the auxiliary sole of FIG. 12.
FIG. 15 is a side elevation, partly in cross-section, of the shoe of FIG. 14 as ready to wear.

The auxiliary sole of FIGS. 12 and 13 is assembled into the shoe of FIG. 14 by any of the methods previously described. In the finished shoe, the auxiliary sole 45, insole 49, and sock lining 48 are all attached together in the region of margin 45a, but lie freely one over the other forward of that point. The shoe is prepared for wear by peeling off the backers and sticking down the auxiliary sole and sock lining, or by removing the auxiliary sole and cementing down the sock lining. Removal of the auxiliary sole allows the heel to seat lower and provides somewhat more room under the overhang of the upper at the heel. The shoe as shown in FIG. 15 is shown with the auxiliary sole and sock lining permanently in place. It is understood that a heat or solvent activated adhesive may be used on the auxiliary sole and the backers omitted, and that various types of adhesives may also be applied to the sock lining and insole, as previously described.

Figure 16:
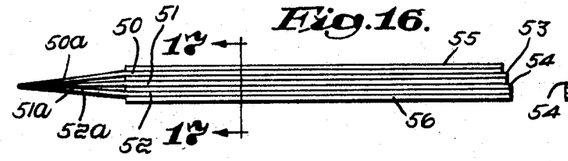
FIG. 16 is a side elevation of a modified form of fore-part auxiliary sole.
Figure 17:
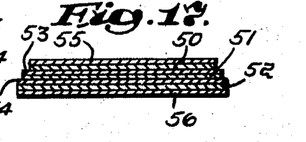
FIG. 17 is a cross-section taken along line 17—17 of FIG. 16.
Figure 18:
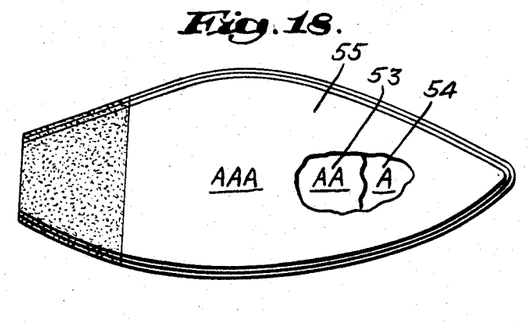
FIG. 18 is a top plan view of the auxiliary sole of FIG. 16.

FIGS. 16 through 18 illustrate a multi-layer auxiliary sole assembly, composed of three layers 50, 51, and 52 with intervening peelable backers 53, 54 and outer backers 55 and 56 on the upper and lower surfaces of the assembly. The three auxiliary sole layers have exposed rear margins 50a, 51a, and 52a which are tapered in thickness toward the rear edge of the assembly and are secured together by adhesive. The lowermost auxiliary sole layer 52 is cut to the outline of the forepart of the innersole for which it is intended but preferably slightly smaller all around for example by 1/16 inch. The layers are graduated in widths and length, layer 51 being slightly smaller than layer 52 all around, for example, by 1/16 inch, and layer 50 being similarly smaller than layer 51. This assembly is put into the shoe during manufacture as previously described.

Each of the layers may be made of such thickness as to change the girth of the shoe forepart by one standard width. To assist in arriving at the size called for, the layers may be appropriately marked. As here illustrated, the backer 55 overlying the top layer is marked AAA indicating that the shoe with the entire assembly in place is equivalent to an AAA width. By removing the top layer 50, the shoe is converted to an AA width, and by removing layer 51 to an A width, as marked on backers 52 and 54. When the entire assembly is removed the shoe becomes a B width. This assembly allows the same shoe to be fitted to four widths.

Figure 19:
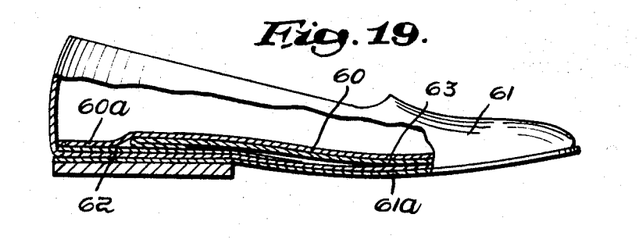
FIG. 19 is a side elevation, partly in cross-section, of a shoe incorporating a modified form of auxiliary sole.

FIG. 19 shows a full length auxiliary sole 60 which is finished on its upper surface in the manner of a sock lining. This auxiliary sole is shown as assembled in a moccasin shoe having a bottom 61a formed in one-piece with the upper 61, and a heel seat lining 62. The auxiliary sole is coated with adhesive on the bottom and has an underlying peelable backer 63, starting forward of the rear margin portion 60a which is attached to the heel seat lining. The backer may be removed and the auxiliary sole cemented down, or the auxiliary sole assembly may be removed entirely if a wider shoe is desired.

Figure 20:
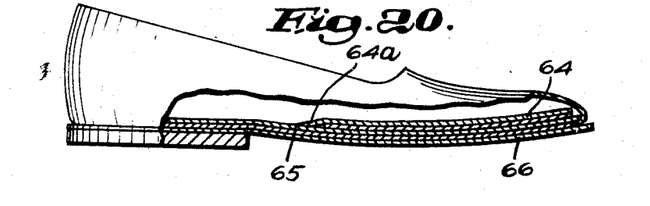
FIG. 20 is a side elevation, partly in cross-section of a shoe incorporating another modification of the auxiliary sole.

FIG. 20 illustrates a forepart auxiliary sole 64 which is also finished on its upper surface so that it acts as part of the lining of the shoe if left in. The auxiliary sole has a rear margin 64a, which is attached to the sock lining 65 of the shoe, and is separated from the sock lining 65 of the shoe, and is separated from the sock lining forward of this point by a peelable backer 66. The shoe may be prepared for wear either by removing backer 66 and cementing down the auxiliary sole, or by removing the auxiliary sole assembly to make the shoe wider.

FIGS. 21 through 25 illustrate a formed auxiliary sole assembly and various ways of installing it in a shoe. This type of auxiliary sole is preferably for shoes having a pronounced arch in the sole, such as medium and high heeled women's shoes. The auxiliary sole assembly is made of three layers 70, 71 and 72 which are formed to the contour of the forepart of the last and skived on the bottom to a taper on their front and rear margins so that they merge in a smooth curve. This assembly is made by cutting the layers from flat material of uniform thickness, temporarily securing them to a last, skiving the front and rear margins of all three at the same time, and applying pressure to mold the assembly to the last.

Figure 21:
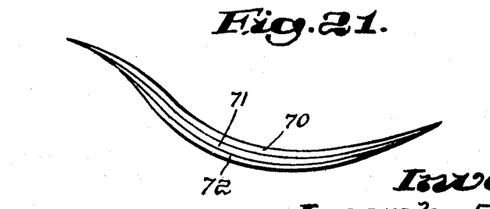
FIG. 21 is a side elevation of a pre-formed type of auxiliary sole assembly.
Figure 22:
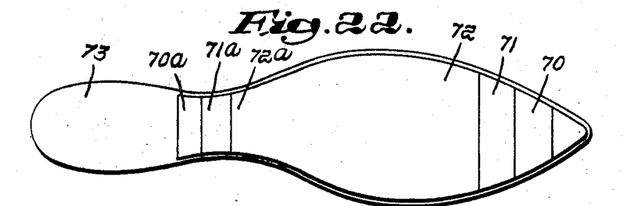
FIG. 22 is a bottom view of the auxiliary sole assembly of FIG. 1 being formed on a last.

The layers are coated with adhesive which is inactivated in the forward part of the assembly. A heat or solvent activated adhesive may be used, or the foreparts of the layers may be masked by backers as in the multi-layer assembly of FIG. 16, for example. The skived rear margins 70a, 71a, 72a are left exposed.

Figure 23:
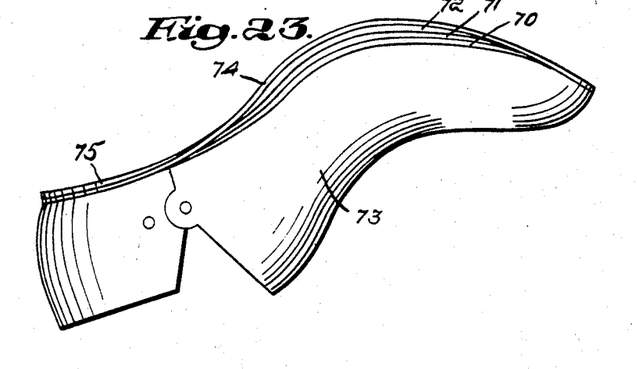
FIG. 23 is a side elevation of the assembly of FIG. 21 assembled with an insole on a last.

According to one method of manufacture, the auxiliary sole assembly is formed, as just described on the last 73 on which the shoe is to be lasted. The insole 74 is then laid over the last and formed to the contour of the last in the usual manner. The adhesive in the region of margins 70a, 71a, 72a is activated so that they become attached to the insole and to each other. The insole 74 is here shown as provided with a counter or stiffener 75 in the heel and instep regions. The upper is then lasted and attached to the insole, and the shoe is completed in the usual manner.

Figure 24:
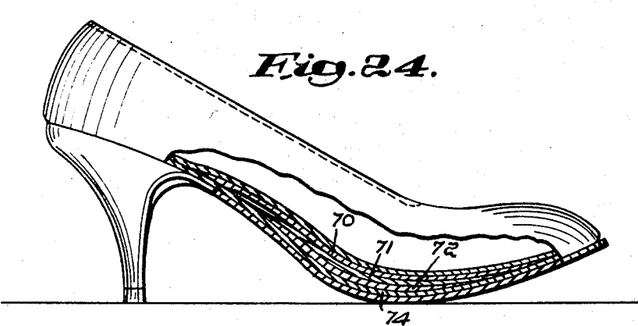
FIG. 24 is a side elevation of a shoe made with the auxiliary sole assembly of FIG. 21.

In the finished shoe shown in FIG. 24, the layers 70, 71a, 72a, are all attached to the insole 74 in the region of their rear margins. The shoe is prepared for wear when sold by activating the adhesive in the forepart to bond the sock lining, auxiliary sole layers and insole together as previously described. The requisite number of layers for obtaining the proper fit may be removed before activating the adhesive in the forepart of the shoe.

If the layers 70, 71, 72 correspond in thickness to one standard width each, the shoe can be made to fit four widths. It will be noted that the layers 70, 71, 72 extend varying distances up the instep or arch portion of the shoe. Removal of a layer thus adds more or less to the length of the forepart as well as the width. If substantially greater length as well as one width increase in size is desired, the top layer can be removed. If adjustment is desired primarily in width, the bottom layer may be removed.

Figure 11:
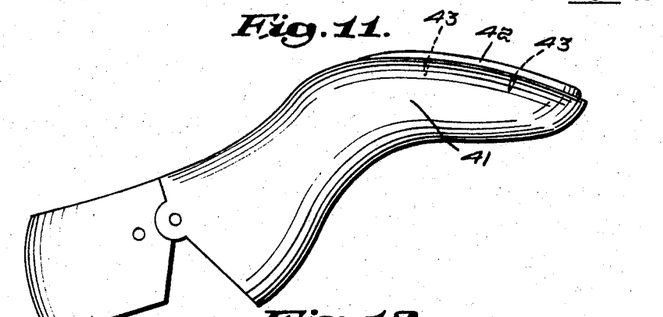
FIG. 11 is a side elevation of a last used to make a shoe according to the method employing the assembly of FIG. 10.
Figures 25, 26:
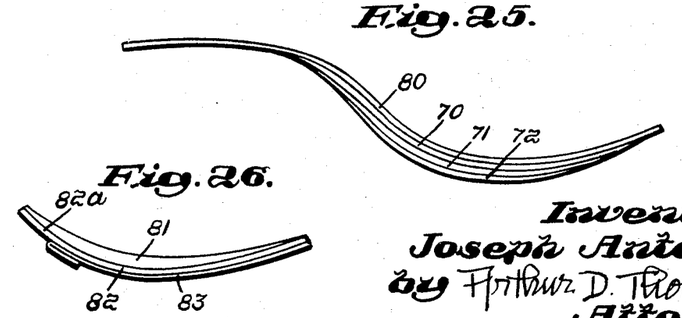
FIG. 25 is a side elevation of the assembly of FIG. 21, attached to a sock lining.
FIG. 26 is a side elevation of an auxiliary sole with a modified adhesive arrangement.
Figure 27:
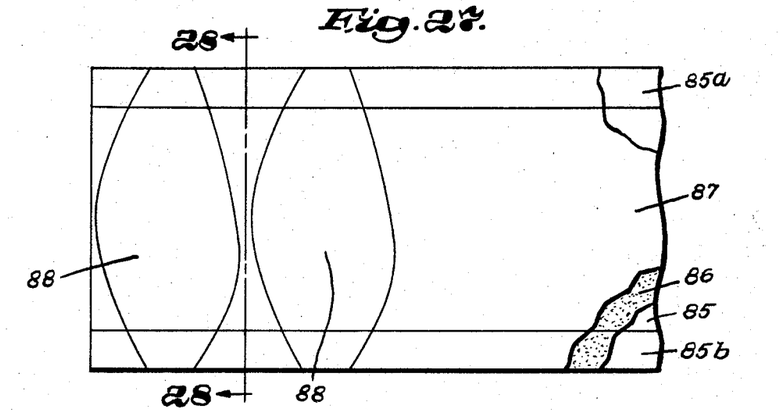
FIG. 27 is a plan view of a strip of material from which auxiliary soles are being cut according to one variation in the method of manufacture.
Figure 28:
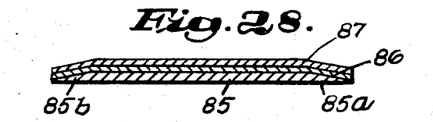
FIG. 28 is a cross-section taken along line 28—28 of FIG. 27.

The auxiliary sole assembly of FIG. 21 may be formed on an auxiliary last or mold and attached to a sock lining 80, which is also formed in the forepart, as shown in FIG. 25. This assembly is placed in the shoe after the latter is removed from the last. In this case the shoe is made on a last which is equipped with a filter plate as shown in FIG. 11, to provide the necessary allowance in the upper.

The formed auxiliary sole just described may be made as a single layer to provide only one width adjustment, or in two, three or more layers according to the range of widths the shoe is intended to fit. It will be noted that in the assembly of FIG. 21 the various layers of the auxiliary sole are cut short at the front. This configuration may be used in shoes with pointed toes if it is desirable, for the sake of appearance to keep the bulk of the upper to a minimum at the point. No size adjustment is required in the area which extends forward beyond the foot, as this area does not affect the fit of the shoe.

FIG. 26 illustrates an adhesive backing which may be used on any of the forms of auxiliary sole described herein. The auxiliary sole 81 has on its under side a layer 82 of material which is coated with pressure sensitive adhesive on both surfaces and carries a peelable backer 83 on its under surface. Such material is known as double faced pressure sensitive adhesive tape or sheet and may be purchased with the peelable backer attached to one side. An auxiliary sole assembly may be conveniently manufactured by laminating the doublefaced adhesive material onto the sheet material from which the auxiliary sole is to be cut, and dieing out the entire assembly at once, or by cutting the backing out separately and applying it to the auxiliary sole. The rear margin 83a of backer 83 is peeled back to provide a pull tab and expose the rear margin 82a of the adhesive coated layer so that the filler sole will be bonded to the insole at that point. Similar backing material may be used to provide adhesive surfaces between layers of multi-layer auxiliary soles, and on the upper surface of the auxiliary sole.

FIGS. 27 through 30 illustrate an efficient method of manufacture of the type of auxiliary sole shown in FIG. 26. A strip of leather, or similar material 85, of a width corresponding to the finished length of a series of auxiliary soles, is skived to a taper along both its side margins 85a and 85b. A layer of double faced adhesive tape 86 of corresponding width, carrying a layer of peelable backing material 87, is laminated onto the skived strip 85. Auxiliary sole blanks 88 are died out transversely from the strip, using the same die as is used for the insoles of the shoes for which the auxiliary soles are intended.

Figures 29, 30:
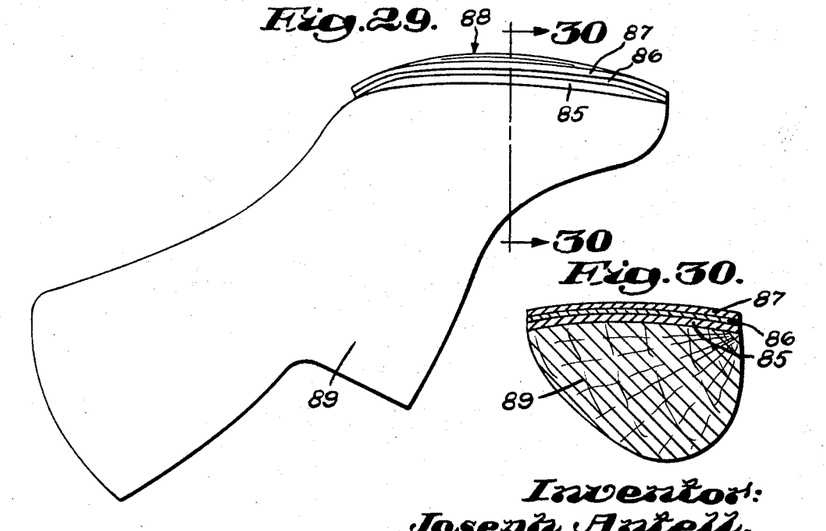
FIG. 29 is a side elevation of an auxiliary sole made from the strip of FIG. 27 and conformed to a last.
FIG. 30 is a cross-section taken along line 30—30 of FIG. 29.

The insole blank 88 is laid over a last 89 of the same size and width as that used for making the shoes, and is molded by pressure to conform to the last. If the last is slightly curved on the bottom from side to side the auxiliary sole will be curved transversely as well as longitudinally, as illustrated in FIG. 30. The auxiliary sole may be assembled into the shoe by any of the methods previously described, it being understood that the rear portion of the backer may be peeled back to expose the adhesive tape and anchor the auxiliary sole to the insole.

The auxiliary sole 88 may be formed separately from the shoe and laid loosely in the forepart of the completed shoe between the insole and the sock lining. As previously stated, the auxiliary sole is made to such a thickness as to reduce the girth of the shoe in the forepart by one width. The adhesive tape and backer are of negligible thickness, the thickness being exaggerated in the drawings for the sake of clarity. If the shoe is made on a B last, for example, the shoe with the auxiliary sole becomes an A width. With the auxiliary sole removed, this will fit a B width.

In all forms of the shoe construction here disclosed, the auxiliary soles may be made thinner than the thickness corresponding to a standard width, if desired, thus providing gradations in size finer than those presently available. The range of width adjustment may be varied according to the style of the shoe, and other considerations. Inexpensive shoes, for example, may be made to a single width with a multi-layer auxiliary sole to cover the range of widths most commonly sold. Finer shoes may be made in several widths, each having auxiliary soles to provide two widths adjustments. The types of adhesive used may also be varied. The term "inactivated adhesive" as used herein is intended to include any adhesive which is in such condition that it will not bond to an adjacent surface, either because of the condition of the adhesive itself or because it is masked by a non-adhesive backer.

This construction may be used in all types and styles of men's, women's, and children's shoes. The manufacturer's costs are substantially reduced because a full range of shoe sizes may be produced with fewer dies, lasts, and patterns, and a much smaller inventory of shoes is adquate to supply the customer's demands. These savings are achieved with no sacrifice in quality. The lasting margins of the uppers, for example, are uniform, whereas these margins vary if the manufacturer cuts costs by using one set of dies and patterns to make several widths on different lasts in the usual way. The auxiliary sole is formed and placed in the shoe in the factory where conditions can be accurately controlled, so that it is correctly positioned and lies flat in the forepart, both when the shoe is tried on and when the auxiliary sole is permanently bonded.

This construction makes it economically feasible to furnish molded rubber soled shoes such as sneakers to fit different widths. Most sneakers are presently made in one width only, because the cost of the molds for the soles is very high, and these items are usually made to sell in the low price range. By incorporating an auxiliary sole as here described, a sneaker can be adapted to fit several widths with very little increase in cost, as the auxiliary sole can be made of inexpensive material and produced by a few simple operations. The auxiliary sole is also of advantage in high priced, special purpose items, such as ski and riding boots, which are not ordinarily stocked in a wide range of widths because the investment in inventory and losses on unsold goods would be too high.

This construction also benefits the retail store, as it reduces the investment in inventory required to maintain a full line of sizes in each style and color. The store is also likely to be left with fewer broken lots and odd pairs to be sold at reduced prices, at the end of a season, so that losses are reduced.

This construction is of benefit also to the customer as he or she is more likely to be assured of getting the correct width in the particular style and color selected. Furthermore, it is quite common for one foot to be wider than the other. The only remedies presently available are to fit the customer to the width of the wider foot, or to stretch one of the shoes. Stretching strains the upper and does not provide a permanent fit. Shoes constructed as here described can be individually fitted to each foot for maximum comfort.

It is understood that variations may be in the construction and methods of manufacture here described.

What is claimed is:

1. A shoe comprising an upper, a sole, an auxiliary sole disposed inside the shoe and having a first portion free of said sole and a second portion removably secured to said sole, and a sock lining overlying said auxiliary sole, freely over said first portion, said first portion having upper and lower surfaces covered with adhesive to secure said auxiliary sole to said sock lining and sole.

2. A shoe as described in claim 1 having a forepart, said auxiliary sole being composed of a single layer of such thickness as to reduce the interior girth of the shoe in the forepart by an amount equivalent to the difference between successive widths in a standard width scale for shoes.

3. A shoe as described in claim 1 having a forepart, said auxiliary sole being composed of several layers, each layer being of such thickness as to reduce the interior girth of the shoe in the forepart by an amount equivalent to the difference between successive widths in a standard width scale for shoes.

4. A shoe having a forepart and comprising an upper, a sole, and an auxiliary sole disposed in said forepart, said auxiliary sole having a first portion free of said sole in said forepart and a second portion secured to said sole rearwardly of said forepart, said auxiliary sole having front and rear margins tapered in thickness.

5. A shoe as described in claim 6, said auxiliary sole comprising a plurality of layers with front and rear margins, successive layers being shorter in the front and rear, and all said margins being tapered in thickness to merge smoothly with one another.

6. A shoe having a forepart and comprising an upper, a sole, and an auxiliary sole disposed in said shoe and free of said upper, said auxiliary sole having a forepart of such thickness as to reduce the girth of the shoe in the forepart by an amount equivalent to the difference between successive widths in a standard width scale for shoes.

7. A shoe as described in claim 6, said auxiliary sole having substantially the contour of said sole in the interior of the forepart.

8. The method of making a shoe which comprise placing an auxiliary sole on a last, laying an insole over the auxiliary sole, attaching the insole to a portion only of the auxiliary sole while leaving the two unattached in their foreparts, and attaching an upper to the insole.

9. The method of making a shoe which comprises forming an elongated strip of sheet material with side margins tapered in thickness, cutting an auxiliary sole blank from the strip transversely so that front and rear portions of the blank are cut from said side margins, assembling a shoe upper and sole on a last, molding the auxiliary sole blank to substantially the same shape as the bottom of the last on which the shoe is assembled, unlasting the shoe, and inserting the auxiliary sole into the shoe in alignment with the sole thereof.

10. The method described in claim 9 which includes the further steps of cutting an insole for the shoe, and said blank with dies of the same contour.

11. The method described in claim 9 which includes the further step of laminating double faced adhesive sheet material onto said strip prior to cutting the blank.

References Cited

UNITED STATES PATENTS

| | | | |
|---|---|---|---|
| 2,482,333 | 9/1949 | Everston | 36—71 X |
| 2,865,097 | 12/1958 | Vollrath et al. | 36—43 |
| 3,105,985 | 10/1963 | Reid et al. | 12—142 |
| 1,457,872 | 6/1923 | Brockman | 12—133 |
| 2,319,143 | 5/1943 | Levy et al. | 36—71 |
| 2,391,083 | 12/1945 | Calderazzo | 36—30 |
| 2,805,432 | 9/1957 | Riggs | 12—133 |
| 2,884,718 | 5/1959 | Kearns | 36—30 |

PATRICK D. LAWSON, *Primary Examiner.*

U.S. Cl. X.R.

12—142; 36—43